Nov. 26, 1935.  J. C. SCHELLIN  2,022,525
REENFORCED HOSE COUPLING CONSTRUCTION
Filed Nov. 23, 1934
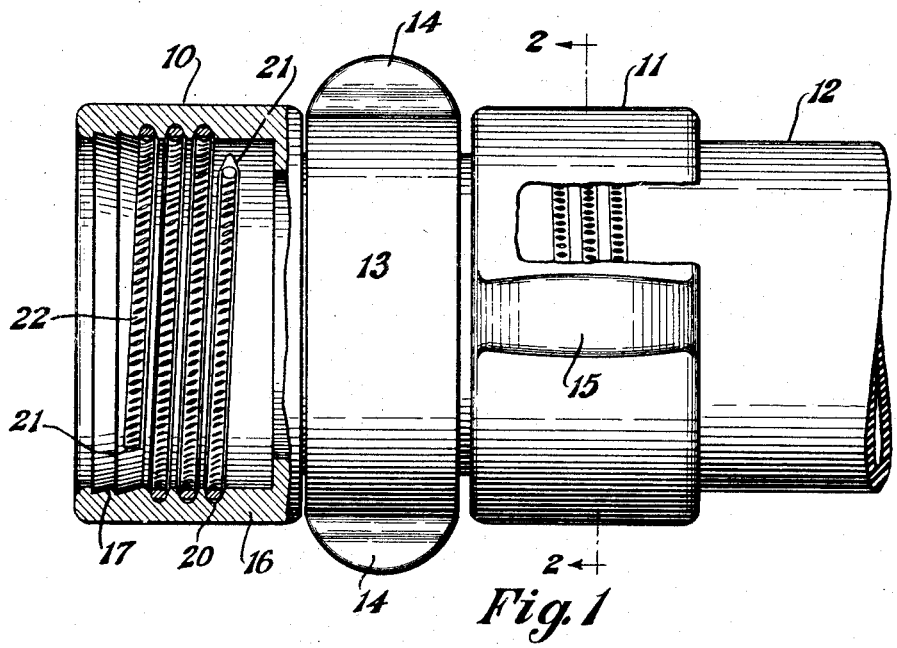
Fig. 1
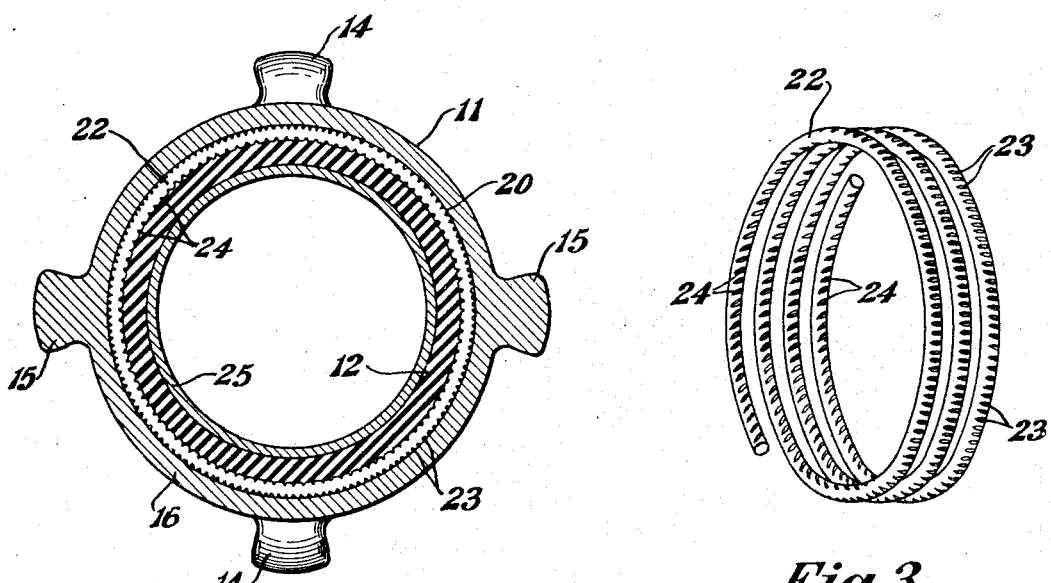
Fig. 2
Fig. 3
Inventor
J. C. Schellin
By Freast and Bishop
Attorneys Patented Nov. 26, 1935

2,022,525

UNITED STATES PATENT OFFICE 2,022,525

REENFORCED HOSE COUPLING CONSTRUCTION

John C. Schellin, Wooster, Ohio, assignor to The Akron Brass Manufacturing Company, Wooster, Ohio, a corporation of Ohio Application November 23, 1934, Serial No. 754,440

6 Claims. (Cl. 285—84)

The invention relates generally to hose couplings, and more particularly to detachable reenforcing means for strengthening the tail members of a hose coupling and for increasing the hose-gripping character thereof; and this application is a continuation in part of my prior copending application, Serial No. 723,077, filed April 30, 1934, and entitled Hose coupling reenforcing means.

The invention is particularly applicable to couplings of the expansion ring type into which the terminal portions of a hose are expanded by means of internal expansion rings, and especially where it is desired to make such couplings of lightweight metals or alloys which do not possess in themselves sufficient strength to resist the internal expanding pressure applied thereto.

By utilizing the present improvements, expansion ring couplings may be satisfactorily made of lightweight material in order that the couplings may be more easily handled and transported than the usual heavy metal type, and the present invention is an improvement on my prior Patent No. 1,914,961, dated June 20, 1933, and entitled Hose coupling reenforcing means.

In said prior patent the tail members of the coupling are reenforced circumferentially by positioning one or more rings of great lineal strength in the walls of the tail members during the casting thereof, so that the rings become an integral part of the tail members.

I have found that still more satisfactory results are obtained by providing a helical groove in the inner wall of the tail piece during the casting thereof, and providing a strong helical spring member preferably of slightly greater outer diameter than the diameter of the bottom of the groove, which spring member may be forced into the groove after the tail piece is cast.

It is therefore an object of the present invention to provide an improved hose coupling construction including detachable reenforcing means which may be inserted in a groove in the tail piece after the same has been cast.

Another object is to provide improved reenforcing means for an expansion ring type coupling, said reenforcing means being adapted to grip the coupling increasingly as the expansion ring is expanded therein.

Another object is to provide improved coupling reenforcing means which is adapted to grip the outer surface of the hose inserted therein and aid in preventing its withdrawal therefrom.

A further object is to provide an improved hose coupling construction including a helical groove in the coupling and a helical spring member adapted to spring-fit in said groove, said helical spring member being adapted to be inserted in or removed from said groove.

And finally, it is an object of the present invention to provide a simple and economical hose coupling construction which may be made of lightweight metal and having a single detachable member of greatly increased strength for circumferentially reenforcing the tail piece of the coupling.

These and other objects are attained by the improvements comprising the present invention, which are disclosed in the following specification, and defined in the appended claims.

The invention may be stated in general terms as comprising a hose coupling including a tail piece having an annular wall for engirdling a hose terminal portion, the inner surface of said annular wall being provided with a helical groove, a helical spring member located in said groove, means on the outer surface of said member for engaging and gripping the bottom surface of said groove, and means on the inner surface of said member for gripping the outer surface of a hose inserted in the tail piece.

In the drawing forming part hereof

Figure 1 is an elevational view of the improved hose coupling construction, parts being broken away and parts in section;

Fig. 2 is a cross sectional view thereof taken substantially on line 2—2, Fig. 1; and Fig. 3 is a perspective view of the detachable reenforcing member.

Similar numerals refer to similar parts throughout the several views of the drawing.

The improved reenforcing hose coupling construction preferably includes two tail piece members 10 and 11 which are adapted to be secured to the terminal portions of sections of hose of rubber and the like, as shown in Fig. 1 by the hose section 12 secured in the tail piece 11.

The tail piece 10 has a collar or swivel member 13 swivelled thereon, and the swivel member 13 is provided with an internal thread adapted to be screwed onto an external thread on the tail piece 11 for connecting the coupling together, all in a usual manner.

The swivel member 13 may be provided with diametrically opposite rocker lugs 14, and the tail piece 11 may be provided with diametrically opposite rocker lugs 15, which are adapted to be engaged by a spanner wrench in order to facilitate screwing the coupling members together.

Each of the tail pieces 10 and 11 is provided with an annular wall 16 for engirdling a hose terminal portion, and each annular wall 16 has formed on its inner surface one or more annular ribs 17, the sharp edges of which provide means for preventing withdrawal of a hose section clamped therein.

In the ordinary type of hose connection these annular hose engaging ribs occupy substantially the entire inner length of the tail piece. In the present invention the grooves 17 are preferably provided only in the outer end portion of the tail piece, and a helical ring groove 20 substantially semi-circular in cross section is formed in the inner surface of and encircles the annular wall 16 adjacent to the grooves 17, during the casting of the tail piece.

The improved detachable reenforcing means preferably includes a spring member in the form of helical spring 22 which is adapted to be forced into the groove 20 after the tail piece has been cast. Preferably, the helical spring 22 is made of spring steel having a lineal strength greatly superior to that of the softer material of the tail piece, which is preferably made of a lightweight metal or alloy. The helical spring 22 is preferably of slightly greater outer diameter normally than the diameter of the bottom wall of groove 20, so that when the member 22 is forced into the groove it will engage the bottom thereof with a spring fit.

The groove 20 is formed to have a length substantially just sufficient to receive the helical spring member 22, so that the ends of the groove substantially abut the ends of the spring 22, as indicated at 21. By means of this construction, after a hose terminal portion is clamped within the tail piece the spring member cannot turn as a unit in the groove, that is, unscrew therefrom, to permit withdrawal of the hose.

The outer circumferential surfaces of the helical spring member 22 are preferably provided with a series of closely spaced notches 23 having sharp edges and disposed longitudinally of the axis of the coupling, and the inner circumferential surfaces of said member are provided with a series of closely spaced notches 24 having sharp edges and angularly disposed to the longitudinal axis of the coupling.

After helical spring member 22 has been positioned in the groove 20 as shown in Fig. 1 the hose terminal portion 12 is inserted therein, and the internal expansion ring 25 within the hose terminal portion is expanded outwardly by any well known expansion means to clamp the hose within the tail piece. This internal expansion tends to cause the convolutions of the spring member 22 to move longitudinally of themselves and circumferentially of the coupling, but the internal expansion pressure at the same time forces the edges of notches 23 outwardly against the bottom of the groove 20, so as to engage and grip the relatively soft metal of the tail piece member and prevent longitudinal movement of the convolutions of the spring member 22, which movement is laterally of the notches 23.

The internal expansion pressure applied to the hose terminal portion 12 also acts to force the edges of the notches 24 into the outer surface of the hose so as to positively grip the same. Since the notches 24 are angularly disposed to the longitudinal axis of the coupling, withdrawal of the hose from the same is opposed by the engagement between the notches 24 and the hose, because the pull on the hose is angular to the disposition of the notches 24.

Obviously, the greater the amount of internal expansion pressure applied to the hose terminal portion, the more the edges of the notches 23 will dig into and grip the bottom wall of the groove 20, and the more the edges of the inner notches 24 will dig into and grip the outer surface of the hose.

By making the detachable reenforcing member 10 in the form of a helix, a single member of relatively great length is provided, possessing a consequently great amount of lineal strength for circumferentially reenforcing the tail piece of the coupling in which it is detachably positioned.

By means of the present improvements, the hose coupling may be made of relatively lightweight metal so as to reduce manufacturing costs, and provide a coupling having requisite strength and which can be handled and transported with a minimum of time and effort.

While the embodiment of the improved reenforcing means disclosed and described herein is in the form of a helical ring, it is apparent that many of the foregoing advantages may be attained by providing a detachable spring member of modified form, without departing from the scope of the invention defined in the appended claims.

I claim:

1. Hose coupling construction including a tail piece having an annular wall for engirdling a hose terminal portion, the inner surface of said annular wall being provided with a helical groove, a helical spring member located in said groove and having a spring fit therein, and means on the spring member for gripping the bottom surface of said groove.

2. Hose coupling construction including a tail piece having an annular wall for engirdling a hose terminal portion, the inner surface of said annular wall being provided with a helical groove, a helical spring member detachably positioned in said groove, means on the spring member for gripping the bottom surface of said groove, and means on the spring member for gripping the outer surface of a hose terminal portion inserted in the tail piece.

3. Hose coupling construction including a tail piece having an annular wall for engirdling a hose terminal portion, the inner surface of said annular wall being provided with a helical groove, a helical spring member in said groove, the outer circumferential surface of said spring member being provided with notches engaging and gripping the bottom surface of the groove, and the inner circumferential surface of said spring member being provided with notches for gripping the outer surface of a hose terminal portion inserted in the tail piece.

4. Hose coupling construction including a tail piece having an annular wall for engirdling a hose terminal portion, the inner surface of said annular wall being provided with a helical groove, a helical spring member in said groove, the outer circumferential surface of said spring member having notches substantially parallel with the longitudinal axis of the tail piece for engaging and gripping the bottom wall of said groove, and the inner circumferential surface of said spring member having notches angularly disposed to the longitudinal axis of the tail piece for gripping the outer surface of a hose terminal portion inserted in the tail piece, to prevent withdrawal of the hose terminal portion therefrom.

5. Hose coupling construction including a tail piece having an annular wall for engirdling a hose terminal portion, the inner surface of said wall having an encircling groove, and a spring member detachably positioned in said groove with a spring fit for strengthening said wall, the spring member being provided with means for gripping the bottom wall of the groove and having means for gripping the outer surface of a hose terminal portion inserted in the tail piece.

6. Hose coupling construction including a tail piece having an annular wall for engirdling a hose terminal portion, the inner surface of said wall having an encircling groove, and a spring member detachably positioned in said groove with a spring fit for strengthening said wall, the outer circumferential surface of said spring member having notches for engaging and gripping the bottom wall of the groove, and the inner circumferential surface of said spring member having notches for gripping the outer surface of a hose terminal portion inserted in the tail piece.

JOHN C. SCHELLIN.